(12) United States Patent
Ma et al.

(10) Patent No.: US 9,454,290 B1
(45) Date of Patent: Sep. 27, 2016

(54) COMPACT ZOOMABLE DATE PICKER

(71) Applicant: Evernote Corporation, Redwood City, CA (US)

(72) Inventors: Helen Asuka Ma, Cupertino, CA (US); Gabriel Campodonico, Oakland, CA (US); Stephen James White, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 152 days.

(21) Appl. No.: 14/212,103

(22) Filed: Mar. 14, 2014

Related U.S. Application Data

(60) Provisional application No. 61/817,901, filed on May 1, 2013.

(51) Int. Cl.
  *G06F 3/048* (2013.01)
  *G06F 3/0482* (2013.01)
  *G06F 3/0488* (2013.01)

(52) U.S. Cl.
  CPC .......... *G06F 3/0482* (2013.01); *G06F 3/0488* (2013.01)

(58) Field of Classification Search
  CPC .............. G06F 3/0482; G06F 3/0488; G06F 2203/04806
  See application file for complete search history.

(56) References Cited

U.S. PATENT DOCUMENTS

| | | | | |
|---|---|---|---|---|
| 8,719,870 | B1 * | 5/2014 | Davies | H04N 5/44543 725/39 |
| 2006/0101384 | A1 * | 5/2006 | Sim-Tang | G06F 11/1448 717/104 |
| 2009/0228793 | A1 * | 9/2009 | Noh | G04G 9/0076 715/703 |
| 2011/0179368 | A1 * | 7/2011 | King | G06F 3/04815 715/769 |
| 2013/0246973 | A1 * | 9/2013 | Tomiyasu | G06F 3/0485 715/830 |
| 2014/0007005 | A1 * | 1/2014 | Libin | G06F 3/0485 715/784 |

\* cited by examiner

*Primary Examiner* — Omar Abdul-Ali
(74) *Attorney, Agent, or Firm* — Muirhead and Saturnelli, LLC

(57) ABSTRACT

Facilitating date selection by a user includes presenting the user with a single timeline band, causing the band to change granularity of date increments in response to the user zooming in and zooming out on the band, causing the band to present different dates based on band positioning initiated by the user, and allowing selection by the user of a date that is presented on the band to the user. The band may show less granular date increments in response to the user zooming in on the band and the band may show more granular date increments in response to the user zooming out on the band. In response to zooming in, a date presented to the user in connection with a less granular view of the band may become part of the date selected by the user.

25 Claims, 6 Drawing Sheets

FIG. 4

COMPACT ZOOMABLE DATE PICKER

CROSS-REFERENCE TO RELATED APPLICATIONS

This application claims priority to U.S. Prov. App. No. 61/817,901, filed May 1, 2013, and entitled "COMPACT ZOOMABLE DATE PICKER," which is incorporated herein by reference.

TECHNICAL FIELD

This application is directed to the field of human-machine interaction and data presentation, and more particularly to the field of application control on multi-touch screens of mobile devices.

BACKGROUND OF THE INVENTION

The count of connected mobile devices in use, including mobile phones and tablets, has recently exceeded the population of our planet. According to market forecasts, by 2016 there will be over ten billion of Internet-connected mobile devices in use, of which around eight billion will be smartphones and tablets. With the proliferation of mobile lifestyles, productivity and convenience of billions of people will increasingly depend on the efficiency of their operation of mobile devices and applications.

Haptic control has become an important efficiency aspect for modern applications running on smartphones and tablets. Touchscreen navigation and operations are a mainstream method of application control in mobile productivity software. Several basic gestures, such as tap, drag, scroll, pinch/zoom, and swipe, are assigned similar functionality across a broad variety of platforms, form factors, devices, and applications, and have long become ubiquitous on tablet and smartphone multi-touch screens.

Usability requirements of touch controlled mobile devices may present software designers with challenging choices between size of touch-aware elements of User Interface (UI), on the one hand, and productive use of screen real estate, on the other hand. Sufficient sizes of touch operated UI elements, such as buttons, navigation panes, tabs, etc. are useful for easy operation, especially by people with larger fingertips. At the same time, productive utilization of a screen space dictates minimizing a navigation related portion of the UI and offering maximum area for a productive content—text, images, tables, graphs, etc. An intrinsic conflict of navigation convenience with the handiness of viewing and editing content invites for constant innovation in touch-enabled UI designs.

One widespread type of mobile software applications which is also common for desktop and web applications is a date-and-time picker, which facilitates date & time entry into calendars, forms and dedicated application fields. Date-and-time pickers are designed to replace error-prone manual typing of date/time values and to offer keyboard-free selection based on a graphical UI.

Two types of date-and-time pickers are calendar style date pickers and a wheel scroller style date pickers. Calendar style pickers, such as used, for example, in the Microsoft Outlook software or the Microsoft Silverlight software, display a monthly calendar grid for a date selection; such grid view may be supplemented with a round clock face for direct time setting or for displaying a time value entered into a field below the clock. In the calendar style picker, months are often switched by horizontal scrolling arrows, which may be located in the upper corners of a grid; a time field may allow selection, manual typing or scrolling via similar small scrolling arrows. Calendar style pickers may be difficult to operate with multi-touch gestures because of small navigational elements (arrows) for switching month and time values and because of the necessity to periodically select small text entities within time field; they are better suited for the precise clicking associated with the use of mouse.

Wheel scroller style pickers used in mobile applications for Apple iOS, Google Android and other operating systems may have a separate, independently operated touch enabled scrollbar for each date-and-time component: day, month, year, hour, minute, and an additional scrollbar or button for the am/pm choice. Such date & time pickers may be operated similarly to multiple-dial locks where each component of the date/time format is independently scrolled to reach a desired position. Well suited for one-finger operation on mobile touch screens, wheel scroller style pickers nevertheless lack visual consistency and convenience of the calendar view, and in many cases do not include days of the week and may occupy a significant portion of the screen, which could challenge efficient combination of wheel scroller style pickers with the application data.

Accordingly, it is desirable to develop compact date-and-time pickers with easy and fast multi-touch operation that can be seamlessly embedded into mobile productivity applications.

SUMMARY OF THE INVENTION

According to the system described herein, facilitating date selection by a user includes presenting the user with a single timeline band, causing the band to change granularity of date increments in response to the user zooming in and zooming out on the band, causing the band to present different dates based on band positioning initiated by the user, and allowing selection by the user of a date that is presented on the band to the user. The band may show less granular date increments in response to the user zooming in on the band and the band may show more granular date increments in response to the user zooming out on the band. Zooming out may be provided by a pinching gesture and zooming in may be provided by a reverse pinching gesture. In response to zooming in, a date presented to the user in connection with a less granular view of the band may become part of the date selected by the user. The date may include a time of day. The time of day may include seconds. The date may be presented to the user by providing a stationary needle that indicates different dates as the band scrolls past the needle based on a position of the needle and dates on the band relative to the needle. Band positioning initiated by the user may include relatively fast scrolling with a swipe gesture in which a finger of the user is lifted from a screen, relatively slow scrolling in which a user moves a finger on the band without lifting the finger off the screen, and tapping the band. Tapping the band may perform zooming in, zooming out, and/or selecting value corresponding to a section of the band where the user tapped. In response to a user tapping on the band, the band may scroll so that a value selected by the user lines up with a stationary needle. Prior to zooming in and zooming out of the band, the granularity may be set to a default level. A default date and time may be set to a current date and time. The default level of granularity may be set by the user. Portions of two months may be displayed on the band simultaneously in response to a current date being close to an end of a month. Facilitating date selection by a user may also include displaying world-wide dates and times using a world map, where a same time in different time zones is shown as local time in a corresponding one of the zones. Local times may be recalculated as the user views different parts of the world map corresponding to different time zones.

According further to the system described herein, computer software, provided in a non-transitory computer-readable medium, facilitates date selection by a user. The software includes executable code that presents the user with a single timeline band, executable code that causes the band to change granularity of date increments in response to the user zooming in and zooming out on the band, executable code that causes the band to present different dates based on band positioning initiated by the user, and executable code that allows selection by the user of a date that is presented on the band to the user. The band may show less granular date increments in response to the user zooming in on the band and the band may show more granular date increments in response to the user zooming out on the band. Zooming out may be provided by a pinching gesture and zooming in may be provided by a reverse pinching gesture. In response to zooming in, a date presented to the user in connection with a less granular view of the band may become part of the date selected by the user. The date may include a time of day. The time of day may include seconds. The date may be presented to the user by providing a stationary needle that indicates different dates as the band scrolls past the needle based on a position of the needle and dates on the band relative to the needle. Band positioning initiated by the user may include relatively fast scrolling with a swipe gesture in which a finger of the user is lifted from a screen, relatively slow scrolling in which a user moves a finger on the band without lifting the finger off the screen, and tapping the band. Tapping the band may perform zooming in, zooming out, and/or selecting value corresponding to a section of the band where the user tapped. In response to a user tapping on the band, the band may scroll so that a value selected by the user lines up with a stationary needle. Prior to zooming in and zooming out of the band, the granularity may be set to a default level. A default date and time may be set to a current date and time. The default level of granularity may be set by the user. Portions of two months may be displayed on the band simultaneously in response to a current date being close to an end of a month. The software may also include executable code that displays world-wide dates and times using a world map, where a same time in different time zones is shown as local time in a corresponding one of the zones. Local times may be recalculated as the user views different parts of the world map corresponding to different time zones.

The proposed system unifies date-and-time picking by offering choices of all date-and-time elements from a single timeline. Visually, a timeline is implemented as a compact band where date-and-time attributes are displayed, adjusted and selected at different zoom levels using a small number of multi-touch gestures for controlling the picker.

Date-and-time zoom levels within the system may be predefined and the initial set of zoom levels may be further customized by users. Below are several examples of zoom level hierarchies, each ordered by an increased time granularity on subsequent scales:

year>month>day>hour>hour with quarter-hour intervals>hour with minutes year>month>day+weekday>hour with quarter-hour intervals year>month>day>hour>minute Every zoom level may be represented by an endless, circular, scrollable band, displayed on a device screen (for example, at one edge of the device screen). The band may be subdivided into a scale of date or time values corresponding to that zoom level displayed incrementally along the band. Horizontal and vertical sizes of each elementary date/time section may be chosen to provide both easy viewing and effortless touch operation. Correspondingly, the sizes may depend on the device form factor and on user preferences.

Each date/time band associated with a certain zoom level allows for at least the following two operations:
 1. Selecting a value
 2. Zooming in/out to an adjacent level.

The band may have an indicator needle at a center of the band; date-and-time values located at the needle may be considered selected values and may be highlighted. A picked date-and-time value is a combination of selected values at all zooming levels; the picked date-and-time value may be built incrementally as a user navigates through different zoom levels and selects needed values. The resultant date may be displayed near the scale or on top of the scale; the latter configuration may save additional screen space for regular application content.

As explained elsewhere herein, the system may employ a minimum set of conventional multi-touch gestures for operating time bands. Zooming in to a higher level of detail and, correspondingly, to shorter date-and-time units, may be performed by a zoom gesture (pinch or reverse pinch), while zooming out to a lower level of detail and longer date-and-time units may be associated with a reverse zoom gesture. Navigation and manipulations within a band to locate and select desired values may be performed using three gestures:
 a. Fast scrolling with inertia along the band may be helpful when a desired value is relatively far from the needle and/or when the full set of values does not fit one screen, in particular, when the desired value is not immediately accessible. For this purpose, a swipe gesture may be used; scrolling speed may depend on speed and acceleration of a user finger when the finger leaves the screen of the mobile device.
 b. For slow scrolling aimed at precise positioning of the needed time and date unit at the needle position, a conventional scrolling gesture (without lifting one or more fingers of the user from the screen) may be employed.
 c. Additionally, a simple gesture, such as tapping a value on a time band may serve as a selection gesture. Tapping may cause an automatic scrolling of the band and snapping a tapped value into the selected position against the needle.

Alternatively, a pair of tap and double-tap gestures (or a single finger tap and a two finger tap) may perform an alternative combination of accelerated selection plus zoom controls: tapping on a date/time unit of a time band may cause a selection of that value and an instant switch to a next (more granular) zoom level, while double-tapping (or tapping with two fingers) may select the value and switch to a previous (less granular) zoom level. Swiping and scrolling gestures may retain their respective roles of fast and controlled access to date-and-time units on each band corresponding to a zoom level.

When a user activates the date picker, the date picker may open at a default zoom level. A default time band may be defined by a task and/or an application where the system is used and may be customized by a user. For example, if a majority of calendar scheduling events occur within the same month, the default zoom level for calendar scheduling applications may be chosen by the system as a day level for the current year and month, which may be extracted from the current date provided by the device system clock. However, when a current date approaches an end day of a month, it may become increasingly probable that the scheduled dates may have to be picked from the next month. In such a case, the system may shift to displaying days of two adjacent months on the day band. For other applications, a default zoom level may be chosen according to specific tasks and requirements of the applications.

The system may handle worldwide date and time by switching to local date-and-time values for scheduling, informational and other purposes according to a desired location on a map and a corresponding time zone. From a user interface standpoint, a world map may be displayed on a device screen next to a band of the time picker. Then, the map may be scrolled (panned) to display different time zones and pin desired destinations. This may cause displaying local times, recalculated for a currently viewed time zone, while the original time may be displayed as a reminder and the time picker may display the UTC/GMT time, as explained elsewhere herein.

The system may be embedded into third party software applications in a variety of ways, for example, as a zoomable, vertical time band along an edge of a device screen, such as a right edge for right-hand operations or a left edge for left-hand operations, subject to user choice. The band may be present on a screen permanently, as well as pulled or otherwise invoked using a touch gesture or a dedicated user interface element such as a tab.

BRIEF DESCRIPTION OF THE DRAWINGS

Embodiments of the system described herein will now be explained in more detail in accordance with the figures of the drawings, which are briefly described as follows.

FIG. 4 is a schematic illustration of system integration into a productivity application, according to embodiments of the system described herein.

DETAILED DESCRIPTION OF VARIOUS EMBODIMENTS

The system described herein provides a mechanism for setting date and time for productivity, scheduling, and other applications running on mobile devices with multi-touch screens by choosing portions of date-and-time values from hierarchically navigable, one-dimensional scales using multi-touch gestures. The system also supports setting worldwide time for multiple locations by navigating a world map and recalculating date-and-time values for various time zones.

Figure 1:
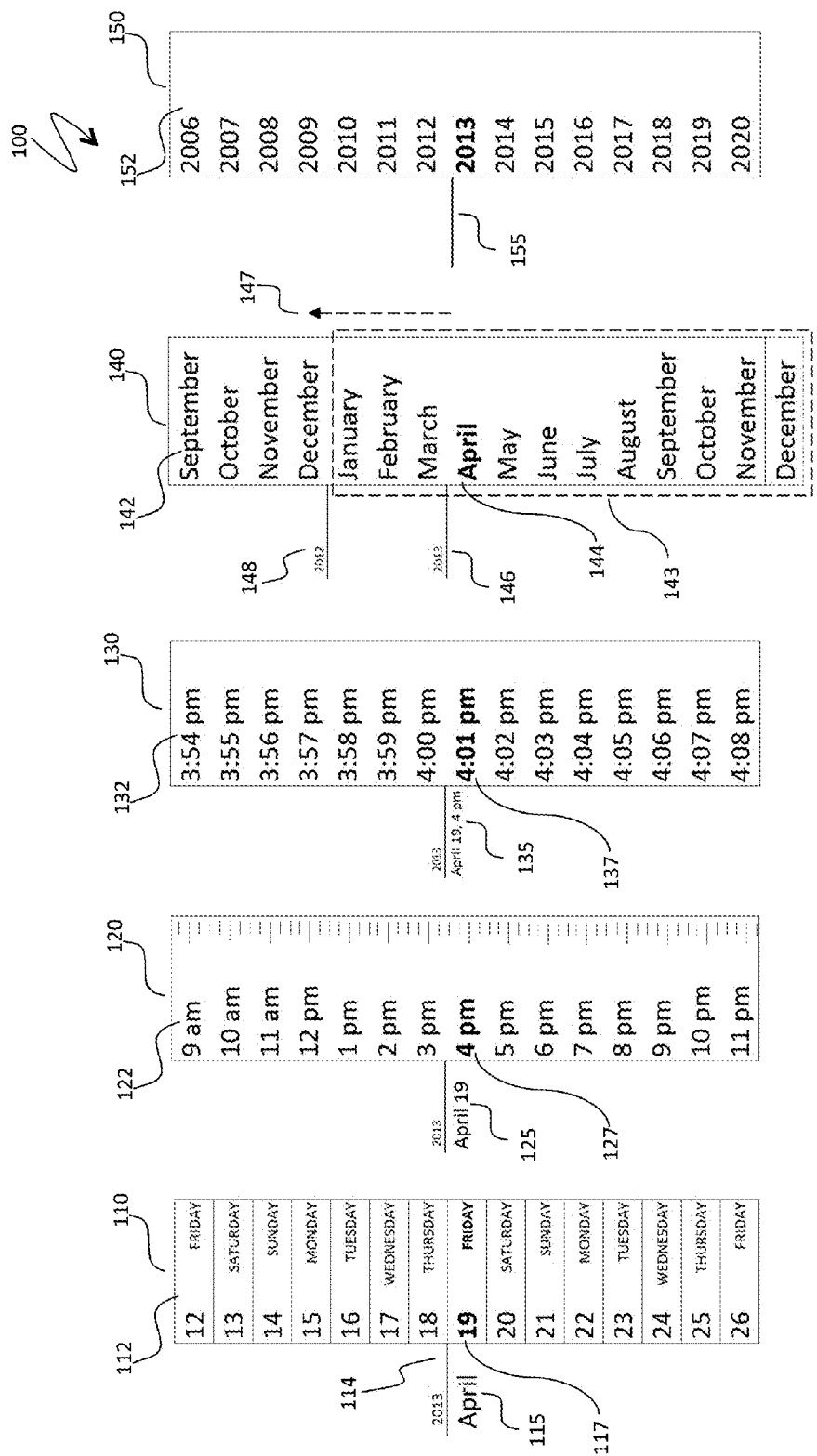
FIGS. 1A-1E are schematic illustrations of different zoom levels, according to embodiments of the system described herein.

FIGS. 1A-1E are schematic illustrations showing different zoom levels. Each of the five levels shown on FIGS. 1A-1E is implemented as a scale of date-and-time units of a certain granularity displayed on a unified scrollable band of fixed size; the size may depend on a form factor and a screen resolution of a mobile device in which the system is running FIG. 1A illustrates a default zoom level in some applications represented by a date scale 110 displayed to a user when a desired year and month are automatically filled in using, for example, system time on the mobile device. Units 112 of the scale are dates and weekday names within a chosen month. A selection needle 114 in the middle of a band is a scrolling destination for date-and-time picking. A previously selected portion of the date-and-time value 115 may be displayed at the needle location (in the example in FIG. 1A, it is April, 2013), while a subsequent portion of the value is picked by scrolling, swiping or tapping the band 110, as explained in more details elsewhere herein. During such scrolling, selected values 117 appear at the needle position and may be highlighted. If a user is satisfied with a selected date (in FIG. 1A, Apr. 19, 2013), the user may leave the band in a displayed position and the selected date may be used as needed in other application(s). If, however, a more granular date-and-time value is desired, the user may apply a zoom gesture, as explained elsewhere herein, and switch to a more detailed hourly scale 120 presented in FIG. 1B.

Units 122 of the band displayed in FIG. 1B are hours 122 with quarter-hour marks. A full value of previously selected portion of a date 125 may be displayed, analogously to FIG. 1A, at a needle position, and a selected value 127 may be highlighted. An additional setup option is shown in FIG. 1C where an hour-and-minute band 120 is divided into units 132 representing minutes. In FIG. 1C, a long minute scale is illustrated: a user may swipe through minutes of a whole 24-hour day or a 12-hour half-day (am or pm); during scrolling, an hour portion of a date-and-time setting may change, so, for example, scrolling up the hour-and-minute band 130 may result in a time value of 3:55 pm. When such value appears highlighted at a needle position 137, an hour in the previously selected date 135 displayed outside the band may also change, showing, in the example of FIG. 1B, Apr. 19, 2013, 3 pm. Alternatively, a minute scale 130 in FIG. 1C may display only a few minutes of a currently selected hour 135 (4 pm) on a circular scale (not shown on FIGS. 1A-1E). In the alternative implementation of FIG. 1C, at the start of a user selection process, minute values 01-08 or 4:01-4:08 may be displayed below the selection needle, while values 54-59 (4:54-4:59) appear above the needle.

Progression between zoom levels 110-120-130 may be achieved by applying a zoom-in gesture, explained elsewhere herein. A reverse zoom-out gesture may advance date-and-time scales to less granular values. Thus, applying a zoom-out gesture to a default zoom level 110 may result in a monthly scale 140, illustrated in FIG. 1D and having months 142 as units; in the example of FIG. 1D, the band is shown in a starting position prior to user navigation or selection, so a selected value 144 corresponds to the starting date 115 in FIG. 1A.

System bands and corresponding scales for various zoom levels may belong to two different types: circular and linear (progressive). A circular scale repeats values when a user scrolls in a single same direction, while a linear scale progresses to new values that may eventually terminate at a first/last value, depending on a scrolling direction; scrolling may stop at a first/last value and may require changing scrolling direction to change values and resume scrolling. Designer and user choices between circular and progressive scales may depend on various factors, including a natural scale length. Thus, for example, a month scale 140 in FIG. 1D has 12 natural values and may be presented to a user in either of the following two formats:

(i) As a circular scale January-December, repeating values and setting a month solely for a particular selected year 146 (not shown in FIG. 1D)

(ii) As a progressive scale that may be scrolled or swiped through to set both a month and a year value within a reasonable year range.

The second implementation (ii) in the format of a progressive scale is shown in FIG. 1D. A group of months 143 (the month of December in that group is not visible when the scale is originally displayed) set a month value for the current year shown at a needle position 146. Another group of months (September to December in the top portion of the scale) belong to the previous year shown at a supplementary needle 148. When a user scrolls the band down, the needle 148 corresponding to the previous year also moves down with a set of months and eventually replaces the main needle 146, which shifts down too and may disappear from the screen, while another supplementary needle for a previous year may appear in the top part of the scale. Scrolling up works similarly, bringing subsequent years to the band and pushing earlier years up the band until the earlier years disappear. Irrespective of scrolling direction, a currently selected month 144 always appears in the middle of the band, next to the main needle 146.

Another example of a progressive scale is a year scale 150 shown in FIG. 1E where scale units are years and a selected year appears near a needle 155. The scale may spread in both directions, past and future, for a pre-defined number of years, such as a century; in embodiments, the range of covered years may be customized by a user.

Figure 2:
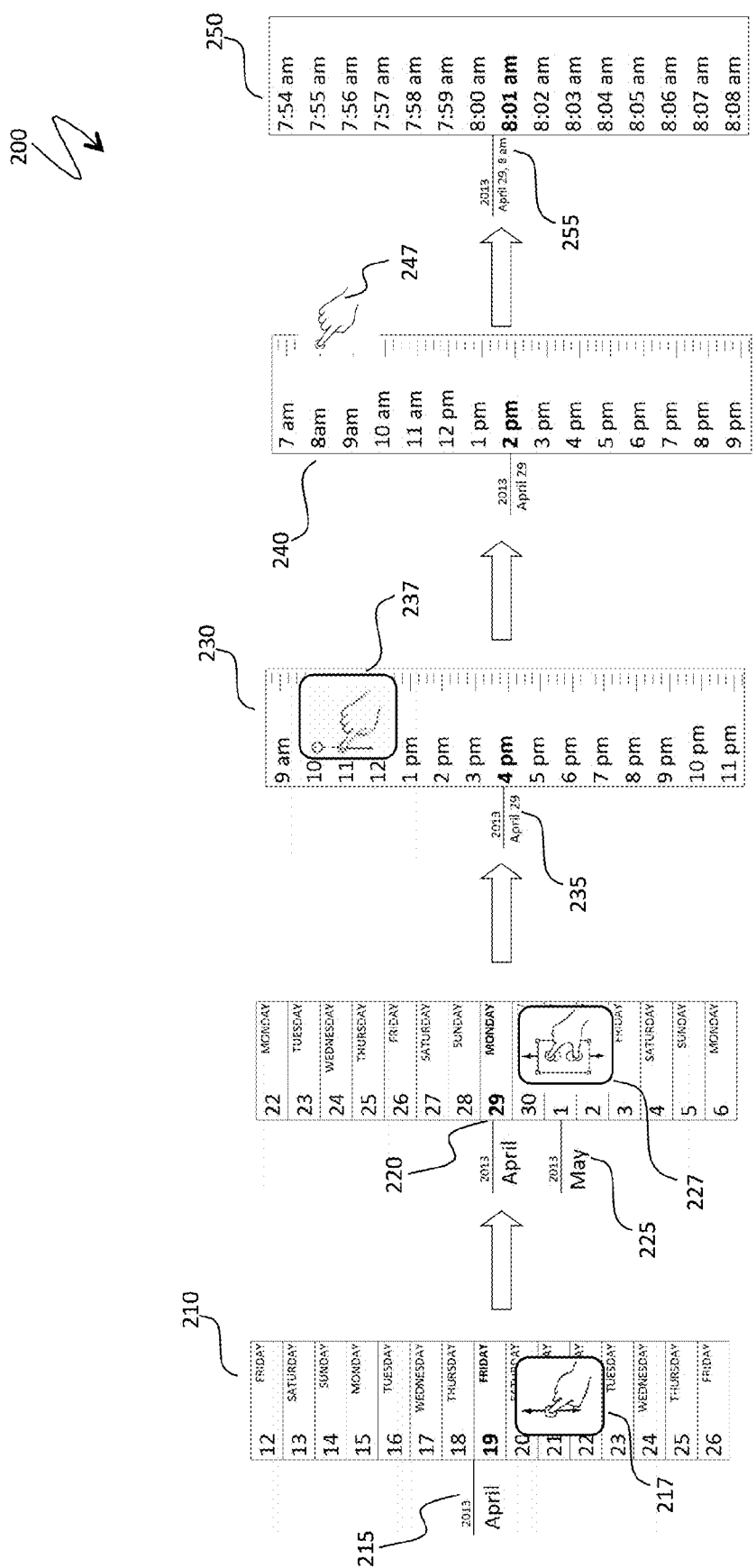
FIG. 2 is a schematic illustration of date-and-time setup using multi-touch gestures, according to embodiments of the system described herein.

FIG. 2 is a schematic illustration 200 of date-and-time setup using multi-touch gestures. An initial date-and-time band 210 carries a progressive date scale. Year and month are displayed around a needle 215 and may be extracted from the operating system date and time on a mobile device. When a user navigates the band in any direction using a scroll gesture 217, new dates appear at a needle and are selected and highlighted. In this way, the user sets up a desired date 220 (Apr. 29, 2013). Note that, due to a progressive nature of the date scale in FIG. 2, supplementary needles marking a start of a new month may appear during scrolling, as illustrated by the supplementary needle 225. Here, the user desires to set up hours; a scale gesture 127 opens a next level of details represented by an hourly scale 230, while a previously selected portion of the date-and-time value 235 is displayed around the selection needle. The user may choose a desired hour setting 240 using a scrolling gesture 217. Alternatively, the user may roll the band with acceleration and inertia using a swipe gesture 237 to quickly get a next portion of dates to the screen. The user may tap a moving band as illustrated by a gesture 247, which immediately selects the desired date-and-time unit and jump to a selected position next to the needle. If the user misses a desired date when tapping, subsequent scrolling or tapping may correct an error. If a more granular setting is needed, the user may apply another zoom-in gesture (not shown in FIG. 2) to move to a minute level 250, which will cause display of full currently selected date-and-time value 255 (including a previously selected hour value) at the needle position of the newly invoked minute level 250. The process may continue in both the zoom-in and zoom-out directions changing granularity levels until the desired date is selected.

Figure 3:
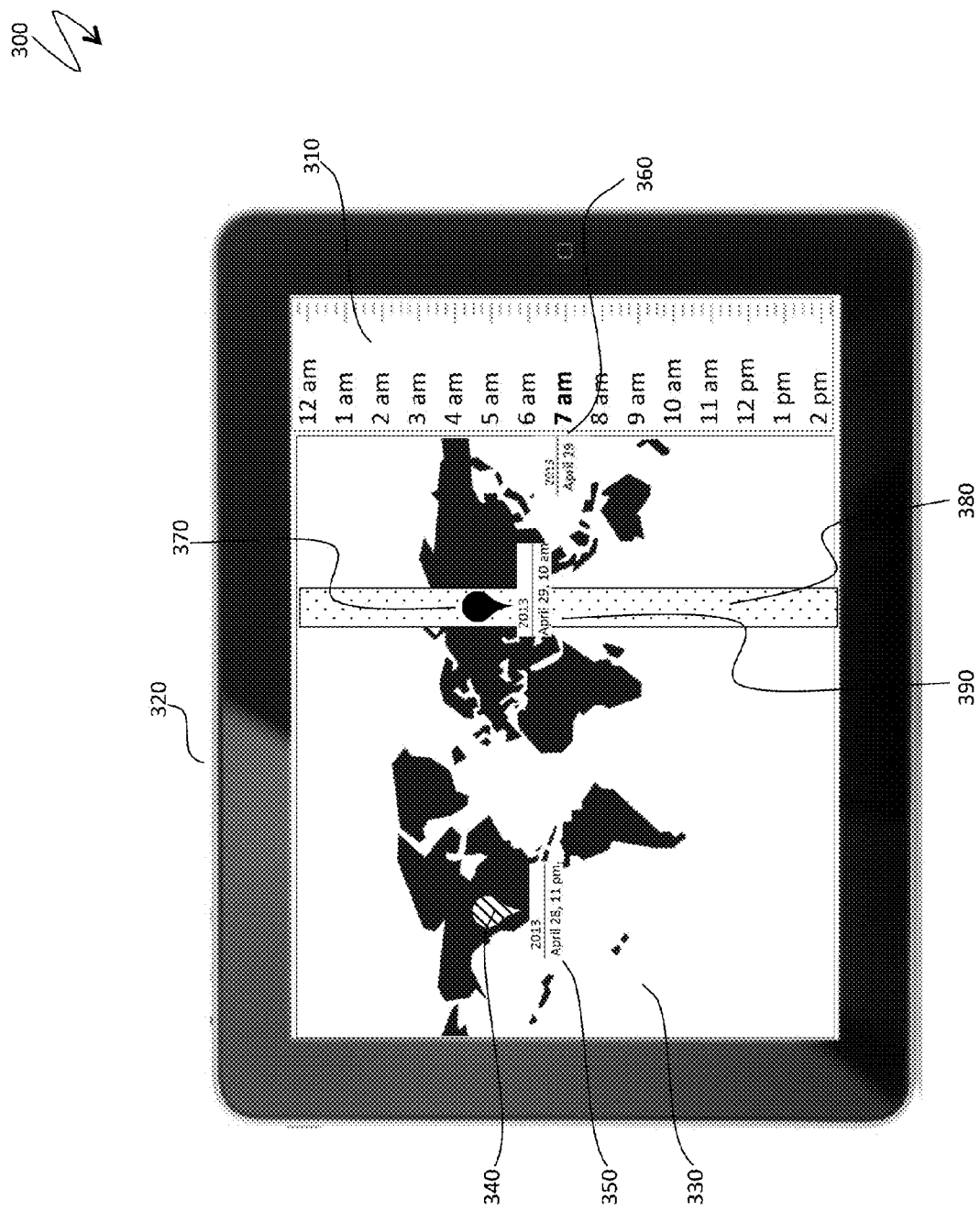
FIG. 3 is a schematic illustration of date-and-time setup for multiple locations, according to embodiments of the system described herein.

FIG. 3 is a schematic illustration 300 of date-and-time setup for multiple locations. An hourly time band 310 is displayed on a screen of mobile device 320. After setting up date-and-time in a local time, a user may open a map 330. The system may display a pin 340 in a current user location. Additionally, the initial local time 350 set up by a user may be displayed near the pin 340, while the time setting on the band may be recalculated to a UTC/GMT value and displayed on the band. In the example of FIG. 3, a user residing in California, United States has originally set up a time value of Apr. 28, 2013, 11 pm using a zoomable date-and-time picker. Upon opening the map, the local time value is displayed under a pin showing a current user location, and a corresponding UTC/GMT time Apr. 29, 2013, 7 am is displayed on a band on the screen.

The user may add new pin(s) 370 to the map in desired location(s); for example, the user may set multiple pins to reflect local times of participants when scheduling an online meeting. The system may display a time zone 380 around a newly added pin and display a local time 390 in the time zone 380 under the newly added pin. Alternatively, the user may be able to continuously navigate the time zone 380 across the map (which may change shape during navigation according to the existing disposition of time zones) and may watch local times displayed in the middle of the current position of the changing time zones. For example, the user may perform such navigation in order to assess the viability of a certain date and time for a meeting the user needs to schedule.

After an initial date-and-time setup and local dates and times in other location(s) have been obtained, the user may use the local dates and times in other locations for different purpose and share with others.

Figure 4:
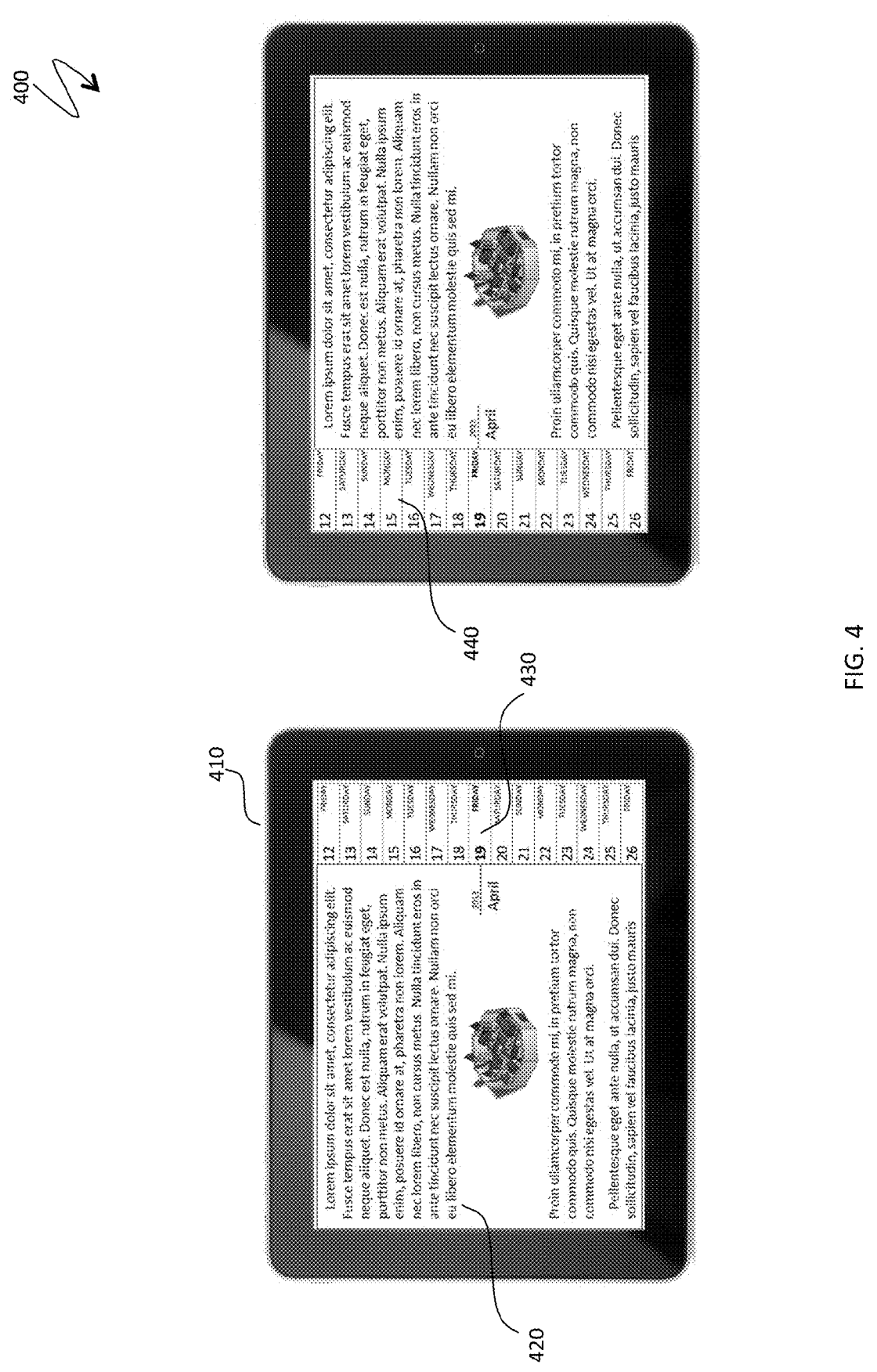

FIG. 4 is a schematic illustration 400 of system integration into a productivity application. A mobile device 410 runs a productivity application 420. A compact zoomable date-and-time picker may be embedded along a vertical edge of a screen; a band 430 at the right side of the screen may better serve right-handed users, while a left side disposition 440 may be more suitable for left-handers. An integrated band may stay on the screen permanently or may be invoked by a click on a button, pulling a tab or swiping in and out; thus, a swipe left-to-right may hide the band 430, while an oppositely directed swipe right-to-left may cause a hidden band to re-appear on a screen. Both a right/left side band location and a choice of permanent or variable display of the band, as well as a method to invoke a temporary band may be customized by a user.

Figure 5:
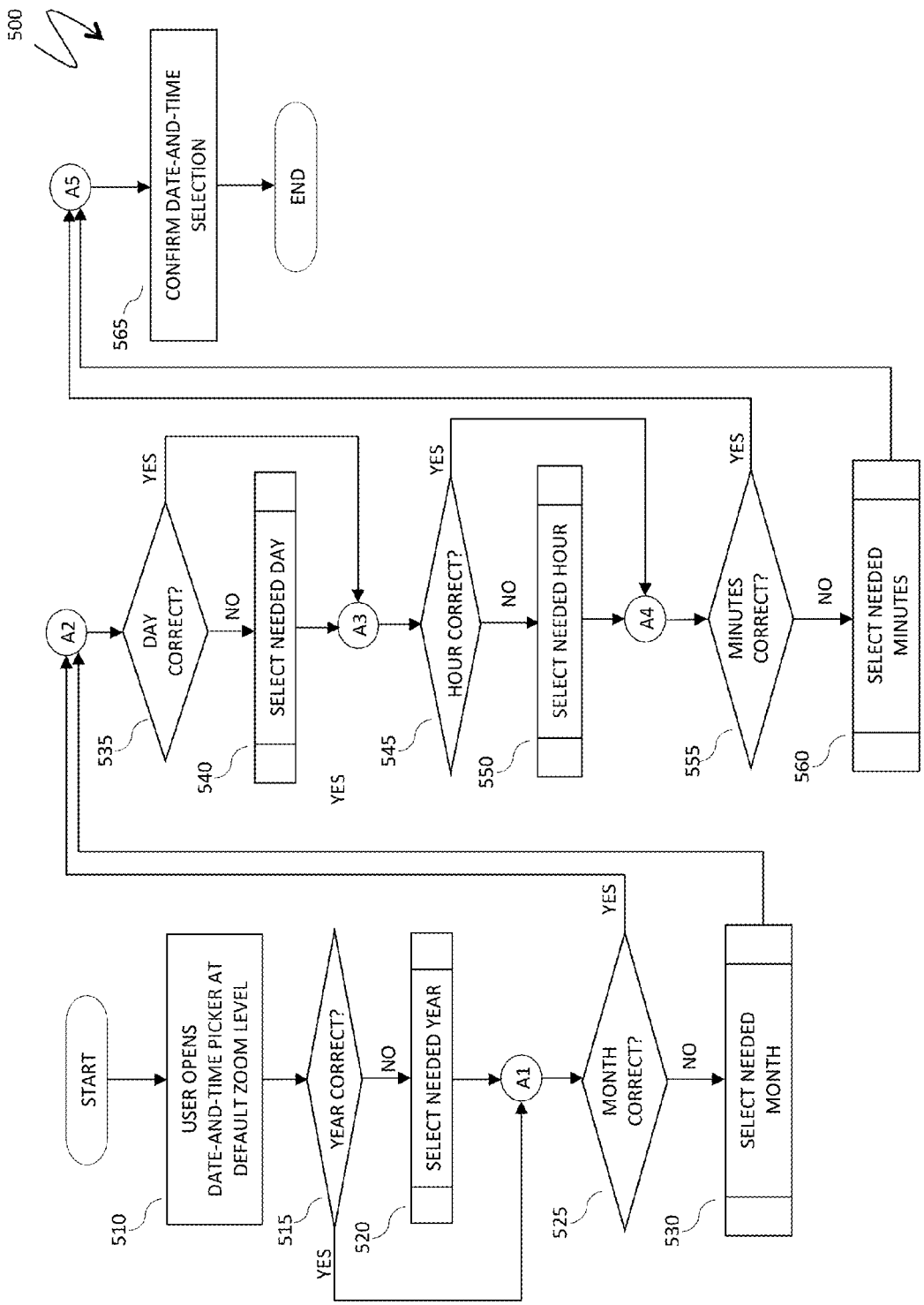
FIG. 5 is a general system flow diagram illustrating date-and-time selection, according to embodiments of the system described herein.

Referring to FIG. 5, a flow diagram 500 illustrates picking a date and time according to the system described herein. Processing starts at a step 510 where a user opens a date-and-time picker at a default zoom level. After the step 510, processing proceeds to a test step 515, where it is determined whether a year value in the current date-and-time setting is correct (i.e., is already at a year desired by the user). If not, processing proceeds to a step 520, where a needed year value is selected. After the step 520, processing proceeds to the test step 525, which may be independently reached from the step 515 if the year value provided by the current date-and-time setting at the step 510 was correct. At the test step 525, it is determined whether a month value in the current date-and-time setting is correct. If not, processing proceeds to a step 530, where a needed month value is selected. After the step 530, processing proceeds to the test step 535, which may be independently reached from the step 525 if the month value provided by the current date-and-time setting at the step 510 was correct.

At the test step 535, it is determined whether a day value in the current date-and-time setting is correct. If not, processing proceeds to a step 540, where a needed day value is selected. After the step 540, processing proceeds to the test step 545, which may be independently reached from the step 535 if the day value provided by the current date-and-time setting at the step 510 was correct. At the test step 545, it is determined whether an hour value in the current date-and-time setting is correct (which includes a determination whether an hour value must be present in the date-and-time setting). If not, processing proceeds to a step 550, where a needed hour value is selected. After the step 550, processing proceeds to the test step 555, which may be independently reached from the step 545 if the hour value was correctly provided at the step 510. At the test step 555, it is determined whether a minute value in the current date-and-time setting is correct (which includes a determination whether a minute value must be present in the date-and-time setting). If not, processing proceeds to a step 560, where a needed minute value is selected. After the step 560, processing proceeds to the step 565, which may be independently reached from the step 555 if the minute value was correctly provided at the step 510. At the step 565, a user confirms date-and-time selection. Following the step 565, processing is complete. Note that the flow chart 500 describes date-and-time setup up to the time granularity levels in minutes and skips possible intermediate zoom levels, for example, for hours-and-quarters or months-and-weeks.

Figure 6:
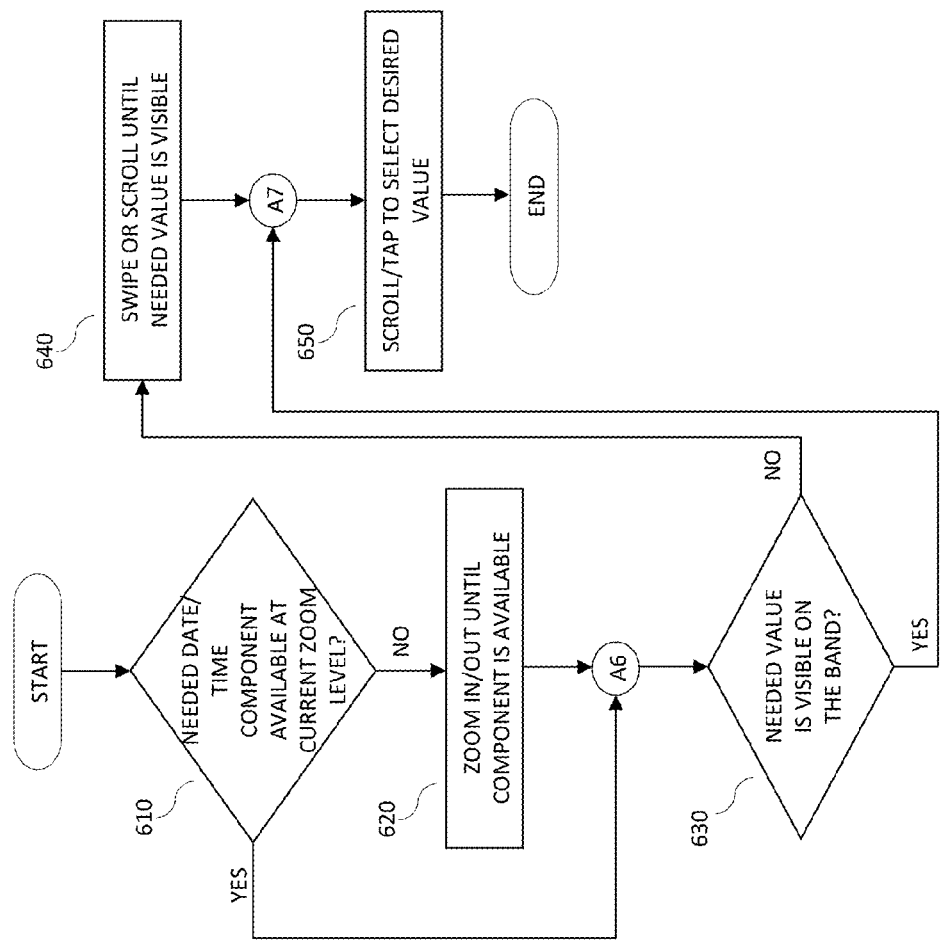
FIG. 6 is a system flow diagram for date-and-time selection and for switching zoom levels, according to embodiments of the system described herein.

Referring to FIG. 6, a flow diagram 600 illustrates in more detail multi-touch operations of zooming, navigation and selection of desired date-and-time values present at each of the steps 520, 530, 540, 550, 560 of the flow diagram 500, described above. Processing starts at a test step 610 where it is determined whether a needed date-and-time component is available at a current zoom level. For example, if a user needs to set up a correct year at the step 520 of the flow diagram 500 while the current scale corresponds to a default zoom level with days and weekdays as date-and-time units, such as illustrated as a scale 110 in FIG. 1A, then the determination at the test step 610 is negative, since the user cannot change the year on that scale. If the result of the test step 610 is negative, processing proceeds to a step 620 where the user performs zoom-in or zoom-out gestures to change zoom levels of the date-and-time picker until a desired level is reached and a needed date-and-time component is available at the corresponding zoom level. After the step 620, processing proceeds to the test step 630, which can be reached independently from the step 610 if the needed date-and-time component was already available at the zoom level presented at the step 610.

At the test step 630, it is determined whether a needed value of the component (such as an hour, day, month, or year) is immediately visible on the band. If not, processing proceeds to a step 640 where the user swipes or scrolls the band until the needed value becomes visible, such as, for example, a time value 240 in FIG. 2, which was initially invisible on the scale 230. User choice between a relatively slow scrolling gesture and a fast swiping gesture may depend on a momentary estimate of the scale length and the assessment how far is the desired value from the current position of the scale and the selection needle. After the step 640, processing proceeds to the step 650, which may be independently reached from the step 630 if the needed value of the component (such as an hour, day, month, or year) was immediately visible on the band at the step 630. At the step 650, the user may scroll the band to put a desired value next to the needle, which causes selection of that value. Alternatively, the user may tap on the selected value to instantly move it to the selected position. Also, as discussed elsewhere herein, the user may both scroll and tap at the step 650. Following the step 650, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible. The system described herein may be implemented with any type of electronic screen capable of being actuated by a touch screen, electromagnetic or other pen.

Note that the mobile device(s) may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of facilitating date selection by a user, comprising:
   presenting the user with a single timeline band;
   causing the band to change granularity of date increments in response to the user zooming in and zooming out on the band;
   causing the band to present different dates based on band positioning initiated by the user by providing a stationary indicator that indicates different dates as the band scrolls past the indicator based on a position of the indicator and dates on the band relative to the stationary indicator;

displaying a moveable indicator that indicates a group of dates before or after a date that is presented on the band to the user according to the stationary indicator, wherein the movable indicator merges with the stationary indicator and a new moveable indicator appears in response to the band positioning initiated by the user; and allowing selection by the user of the date that is presented on the band to the user.

2. A method, according to claim 1, wherein the band shows less granular date increments in response to the user zooming in on the band and the band shows more granular date increments in response to the user zooming out on the band.

3. A method, according to claim 2, where zooming out is provided by a pinching gesture and zooming in is provided by a reverse pinching gesture.

4. A method, according to claim 2, wherein, in response to zooming in, a date presented to the user in connection with a less granular view of the band becomes part of the date selected by the user.

5. A method, according to claim 1, wherein the date includes a time of day.

6. A method, according to claim 5, wherein the time of day includes seconds.

7. A method, according to claim 1, wherein prior to zooming in and zooming out of the band, the granularity is set to a default level.

8. A method, according to claim 7, wherein a default date and time are set to a current date and time.

9. A method, according to claim 7, wherein the default level of granularity is set by the user.

10. A method, according to claim 7, wherein portions of two months are displayed on the band simultaneously in response to a current date being close to an end of a month.

11. A method, according to claim 1, further comprising:
displaying world-wide dates and times using a world map, wherein a same time in different time zones is shown as local time in a corresponding one of the zones.

12. A method, according to claim 11, wherein local times are recalculated as the user views different parts of the world map corresponding to different time zones.

13. Computer software, provided in a non-transitory computer-readable medium, that facilitates date selection by a user, the software comprising:
executable code that presents the user with a single timeline band;
executable code that causes the band to change granularity of date increments in response to the user zooming in and zooming out on the band;
executable code that causes the band to present different dates based on band positioning initiated by the user by providing a stationary indicator that indicates different dates as the band scrolls past the indicator based on a position of the indicator and dates on the band relative to the stationary indicator;
executable code that displays a moveable indicator that indicates a group of dates before or after a date that is presented on the band to the user according to the stationary indicator, wherein the movable indicator merges with the stationary indicator and a new moveable indicator appears in response to the band positioning initiated by the user
executable code that allows selection by the user of the date that is presented on the band to the user.

14. Computer software, according to claim 13, wherein the band shows less granular date increments in response to the user zooming in on the band and the band shows more granular date increments in response to the user zooming out on the band.

15. Computer software, according to claim 14, where zooming out is provided by a pinching gesture and zooming in is provided by a reverse pinching gesture.

16. Computer software, according to claim 14, wherein, in response to zooming in, a date presented to the user in connection with a less granular view of the band becomes part of the date selected by the user.

17. Computer software, according to claim 13, wherein the date includes a time of day.

18. Computer software, according to claim 17, wherein the time of day includes seconds.

19. Computer software, according to claim 13, wherein prior to zooming in and zooming out of the band, the granularity is set to a default level.

20. Computer software, according to claim 19, wherein a default date and time are set to a current date and time.

21. Computer software, according to claim 19, wherein the default level of granularity is set by the user.

22. Computer software, according to claim 19, wherein portions of two months are displayed on the band simultaneously in response to a current date being close to an end of a month.

23. Computer software, according to claim 13, further comprising:
executable code that displays world-wide dates and times using a world map, wherein a same time in different time zones is shown as local time in a corresponding one of the zones.

24. Computer software, according to claim 23, wherein local times are recalculated as the user views different parts of the world map corresponding to different time zones.

25. Computer software, according to claim 13, wherein band positioning initiated by the user includes tapping the band.

* * * * *